US012783060B1

(12) United States Patent
Morsy

(10) Patent No.: US 12,783,060 B1
(45) **Date of Patent: *Nov. 3, 2026**

(54) DEVICE AND METHOD FOR PLAYING AUDIO DATA BASED ON A SWIPING GESTURE

(71) Applicant: Algoriddim GmbH, Munich (DE)

(72) Inventor: Kariem Morsy, Munich (DE)

(73) Assignee: Algoriddim GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/249,247

(22) Filed: Jun. 25, 2025

Related U.S. Application Data

(63) Continuation of application No. 19/197,505, filed on May 2, 2025.

(51) Int. Cl.
*G06F 3/01* (2006.01)
*G10H 1/00* (2006.01)

(52) U.S. Cl.
CPC ........... *G06F 3/017* (2013.01); *G10H 1/0025* (2013.01); *G10H 1/0091* (2013.01); *G10H 2210/056* (2013.01); *G10H 2210/125* (2013.01); *G10H 2210/136* (2013.01); *G10H 2250/035* (2013.01)

(58) Field of Classification Search
CPC .... G06F 3/017; G10H 1/0025; G10H 1/0091; G10H 2210/056; G10H 2210/125; G10H 2210/136; G10H 2250/035
USPC ........................................................ 84/625
See application file for complete search history.

(56) References Cited

U.S. PATENT DOCUMENTS

| | | | | |
|---|---|---|---|---|
| 11,216,244 | B2 * | 1/2022 | Morsy | G06F 3/165 |
| 2011/0216075 | A1 * | 9/2011 | Shigeta | G06F 3/048<br>345/473 |
| 2014/0184491 | A1 * | 7/2014 | Kim | B60K 35/10<br>345/156 |
| 2018/0035082 | A1 * | 2/2018 | Patil | A47D 15/00 |
| 2018/0239437 | A1 * | 8/2018 | Kim | G06F 3/017 |
| 2020/0406752 | A1 * | 12/2020 | Ahn | B60K 15/00 |
| 2020/0410264 | A1 * | 12/2020 | Ahn | B60K 35/10 |
| 2021/0326102 | A1 * | 10/2021 | Morsy | G06F 3/165 |
| 2022/0095010 | A1 * | 3/2022 | Gallagher | G06F 3/017 |

(Continued)

FOREIGN PATENT DOCUMENTS

| | | | | | |
|---|---|---|---|---|---|
| CN | 118276674 | A | * | 7/2024 | G06F 3/017 |
| WO | WO-0179859 | A1 | * | 10/2001 | G10H 1/0008 |
| WO | WO-2025072019 | A1 | * | 4/2025 | G06F 3/017 |

*Primary Examiner* — Christina M Schreiber

(74) *Attorney, Agent, or Firm* — Kilpatrick Townsend & Stockton LLP

(57) ABSTRACT

A device for playing audio data including an audio input unit for providing audio data of a sequence of songs, a user input unit for detecting swiping gesture of a user of the device, a song selection unit for selecting a song from among the sequence as a current song for playback, and to change song selection from a current song to an adjacent song in the sequence, such that repeated detection of the swiping gesture results in a consecutive selection of the songs along the sequence, and a playback unit for playing audio data of at least the current song. The device includes a mixing unit for obtaining mixed audio data by mixing audio data of the current song with audio data of the adjacent song using an audio mixing ratio. Mixing may occur upon detection of the swiping gesture, and mixing can include matching BPM, beats, and key.

30 Claims, 6 Drawing Sheets

(56) References Cited

U.S. PATENT DOCUMENTS

| | | | | |
|---|---|---|---|---|
| 2023/0095263 | A1* | 3/2023 | Satongar | A45C 11/001 715/716 |
| 2023/0343314 | A1* | 10/2023 | Morsy | G10H 1/0025 |
| 2024/0061513 | A1* | 2/2024 | Reisman | G06F 1/163 |
| 2024/0144727 | A1* | 5/2024 | Riopelle | G06V 40/28 |
| 2024/0146350 | A1* | 5/2024 | Grétarsson | G06F 1/163 |
| 2025/0110565 | A1* | 4/2025 | Tsoi | G06F 3/017 |

* cited by examiner

DEVICE AND METHOD FOR PLAYING AUDIO DATA BASED ON A SWIPING GESTURE

CROSS REFERENCE TO RELATED APPLICATION

This application is a continuation of U.S. patent application Ser. No. 19/197,505, filed May 2, 2025, the disclosures of the above-referenced priority application is incorporated herein by this reference in its entirety.

FIELD OF INVENTION

The present invention relates to a device and a method for playing audio data of a sequence of three or more songs, wherein playback is changed from a current song to an adjacent song along the sequence of songs upon detection of a swiping gesture of a user.

BACKGROUND

In a wide field of applications, music is played by electronic devices such as smartphones, tablet computers or other computers which provide music in the form of a plurality of audio files, wherein each audio file contains audio data of a particular song. Conventional electronic devices are capable of storing playlists for organizing the songs, wherein each playlist comprises a sequence of three or more songs arranged in a predetermined order. Along the sequence of songs of such playlists, the device is usually configured to play one song after another such that a current song of the sequence is played back and upon reaching the end of the current song, playback of the next song along the sequence is started. Further, conventional devices include a user input unit for detecting a user input commanding immediate switch of the song towards an adjacent song in the sequence of songs, i. e. the next song or the previous song, even during playback of the current song. The user input may be a swiping gesture for forward swiping or reverse swiping resulting in a corresponding change of selection of the current song to the next song or the previous song, respectively.

Although conventional methods and devices are capable of automatic playback of a plurality of songs without a requirement of user interaction or quick browsing of playlists or song libraries, one drawback of the conventional technology is a break of the musical flow and an abrupt change or interruption of the continuity of rhythm, harmony and melody, due to the very nature of different songs having different musical attributes. In particular, when manually changing song selection and browsing through multiple songs, the sudden switch of music can be audibly unpleasant and can make browsing through songs a tedious task. One could think of a way to solve this problem by fading out the current song and fading in the adjacent song through volume control of the two songs. However, this would only slightly reduce the disruption of the musical flow and, on the other hand, would delay the process of switching songs and therefore impede quick browsing through a playlist.

SUMMARY

In view of the foregoing circumstances, it was an objective of the present invention to provide a device and a method for playing audio data of three or more songs which allow quick or smooth browsing through the sequence of songs with reduced disturbance of the musical flow.

According to the first aspect of the present invention, this object is achieved by a device for playing audio data, comprising an audio input unit for providing audio data of a sequence of three or more songs, a user input unit for detecting at least a swiping gesture of a user of the device, a song selection unit configured to select a song from among the sequence as a current song for playback, and to change song selection from a current song to an adjacent song in the sequence (the next song or the previous song in the sequence) each time the swiping gesture is detected, such that repeated detection of the swiping gesture results in a consecutive selection of the three or more songs along the sequence, and a playback unit for playing audio data of at least the current song, wherein the device further comprises a mixing unit for obtaining mixed audio data by mixing audio data of the current song with audio data of the adjacent song using an audio mixing ratio between the adjacent song and the current song, wherein the mixing unit is configured to set the audio mixing ratio based on a position of the user's finger during the detected swiping gesture and/or to continuously change the audio mixing ratio, and wherein the playback unit is configured to play the mixed audio data when the swiping gesture is detected.

Therefore, according to an important feature of the present invention, when changing song selection from a current song to an adjacent song, instead of simply stopping the current song and thereafter starting the adjacent song, the device of the present invention comprises a mixing unit for mixing audio data of the current song with audio data of the adjacent song such as to allow a smooth transition to the adjacent song and thus avoid a break or sudden change of the musical flow. Therefore, each time a user initiates a change of song selection from the current song to an adjacent song by a corresponding swiping gesture, the device generates mixed audio data from the current song and the adjacent song and plays a transition from the current song to the adjacent song by using such mixed audio data. Therein, the mixing ratio which represents an audible contribution of the adjacent song relative to the current song, is set such as to depend on the position of the users finger during the detected swiping gesture, such as to change to mixing ratio continuously and in correspondence with the swiping movement. In addition or alternatively, the audio mixing ratio may be continuously changed (with time) in an automatic manner (automatic transition) with a predetermined change rate that may be independent from the actual dynamic of the swiping gesture (e.g. independent of the swiping speed) and that is lower than a maximum change rate, such that a sudden change of the musical flow is avoided.

These illustrative aspects are mentioned not to limit or define the disclosure, but to provide examples to aid understanding thereof. Additional aspects are discussed in the Detailed Description, and further description is provided there.

DETAILED DESCRIPTION

Figure 1:
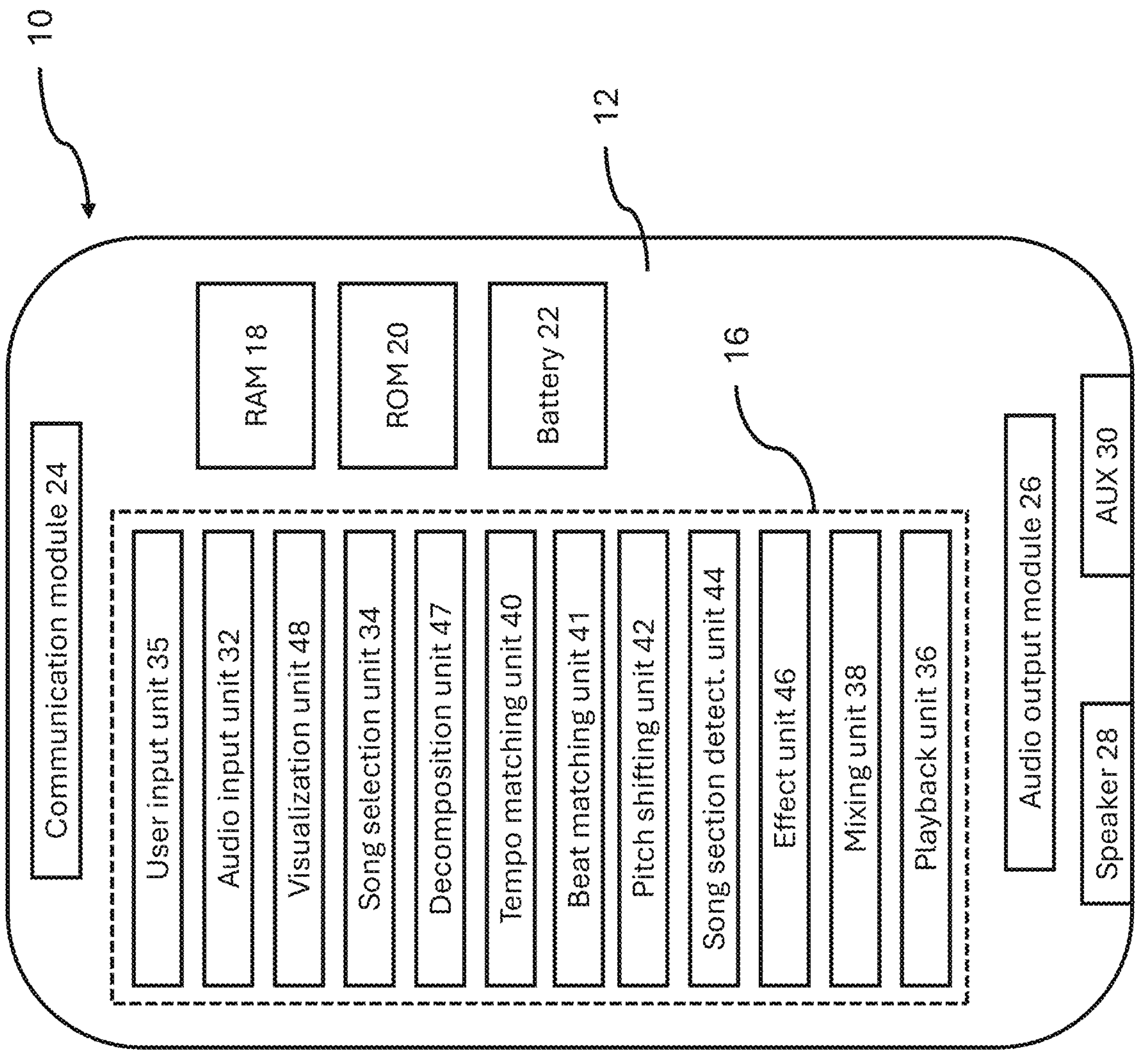
FIG. 1 is a schematic illustration of a device according to a first embodiment of the present invention.

In the context of the present disclosure, the order of the sequence of three or more songs may be fixed during performance of multiple swiping gestures in forward and/or reverse directions, such that the user may deliberately navigate up and/or down (forward/reverse) in a playlist as desired. Alternatively, the order of the sequence may be randomized (shuffle mode) or changed between randomized order and fixed order during operation of the device. In a randomized order, the "adjacent song" which is to be selected upon detection of a swiping gesture, in particular a "next song" or a "previous song" in the sense of the present disclosure, is any random other song of the (same) sequence.

In the context of the present disclosure, a song is in particular an individual piece of music, i. e. an entire title, for example, the song "Piano Man" from Billy Joel, playback duration 05:39. Such songs are available in a digital format through conventional music distribution platforms such as Apple Music, Spotify, etc. One entire title or piece of music distributed by such platforms as an individual music file is referred to as one song in the sense of the present disclosure.

The user input unit may be configured to detect at least a forward swiping gesture wherein the user's hand is moved in a predetermined forward swiping direction, and a reverse swiping gesture, wherein the user's hand is moved in a predetermined reverse swiping direction that is opposite to the forward swiping direction. In this way, the plurality of three or more songs of the sequence of songs may be browsed in forward direction by a repeated forward swiping gesture and can likewise be browsed in reverse direction by a repeated reverse swiping gesture. This means that repeated detection of the forward swiping gesture results in a consecutive selection of the next song of the three or more songs along a forward swiping direction of the sequence, and repeated detection of the reverse swiping gesture results in a consecutive selection of a previous song of the three or more songs along a reverse direction of the sequence.

The user input unit may be implemented by a touch sensitive display (a touch screen) capable of accepting user input through a hand of the user, in particular through a user's finger which touches the display.

Alternatively, the user input unit may be implemented by a gesture detecting unit which is configured to detect a swiping gesture performed by a users hand. In an embodiment, one or more cameras may be provided for detecting and tracking a movement of a users hand, or any other detecting device, such as a handheld device or wearable comprising one or more movement sensors (e.g. gyroscopes or accelerometers) which are likewise suitable to track a movement of a users hand. In one example, movement sensors integrated within the very same device for playing audio data may be used to detect a swiping gesture, if the user is swinging or otherwise moving the entire device (for example a smartphone) in a defined manner. In another example, cameras or other detecting devices may be provided as part of an artificial reality apparatus capable of providing visual input for the user to create an artificial reality environment, including, for example, virtual reality (VR) technology, augmented reality (AR) technology and mixed reality (MR) technology, wherein the artificial reality device may comprise a headset, such as glasses, which displays or projects images to both eyes of the user, such that the user views artificial objects and an artificial environment in the three-dimensional space surrounding the user. Examples for artificial reality devices suitable for implementing the present invention include Apple Vision Pro (Trademark of Apple Inc.) and Meta Quest 3 (Trademark of Meta Platforms, Inc.).

The audio input unit may be configured to stream audio data, in particular stereo or multichannel audio files) from a music distribution platform through a network such as the Internet, or to read audio data from a local or peripheral storing device.

In a preferred embodiment of the present invention, the audio mixing ratio between the adjacent song and the current song may be set to continuously change depending on the position of the users hand, in particular such as to increase when the users hand moves along a predetermined swiping direction corresponding to a change of song selection from the current song to the adjacent song, and to decrease when the users hand moves along a direction opposite to the predetermined swiping direction. In this way, when swiping from a current song to an adjacent song, a complete transition is played from the current song to the adjacent song, which means that the musical perception of the audio data played back by the device continuously changes from playing substantially only the current song at the beginning of the swiping gesture (beginning of the transition) to an increased contribution of the adjacent song with a simultaneous decrease of the contribution of the current song when the swiping gesture continues (in the course of the transition), and eventually to a complete vanishing of the contribution of the current song and predominant or exclusive playback of the adjacent song at the end of the swiping gesture (end of the transition). After completing the swiping gesture, the change of song selection is completed such that only the previous adjacent song, which is the new current song, is audible. In particular, such device may be configured to continuously increase the audio mixing ratio from a minimum value to a maximum value when playing a complete transition from the current song to the adjacent song, upon detection of the swiping gesture.

A mixing ratio according to the present disclosure, for example, an audio mixing ratio or a video mixing ratio, between a second song and a first song may be understood as a contribution of the second song, in particular relative to the first song, in the mixed audio data or mixed video data, when the mixed audio/video data are obtained by mixing the two songs based on the mixing ratio. For example, if audio data of a first song with volume level V1 are mixed with audio data of a second song with volume level V2, an audio mixing ratio between the second song and the first song may be defined as increasing with increasing contribution of the second song, i.e., with increasing volume level V2 relative to the first volume level V1 (increasing V2 and/or decreasing V1).

In one example, the mixing ratio may in particular be a normalized value, for example, normalized by the sum of the two volume levels V1 and V2, which means that the mixing ratio r may be obtained by the following formula:

$$r=V2/(V1+V2).$$

In preferred embodiments of the present invention, when playing a transition from a first song to a second song, for example, a transition from a current song to an adjacent song, the mixing ratio may be changed, preferably continuously changed, from 0 at the beginning of the transition to 1 at the end of the transition. Specifically, at the beginning of the transition, the mixing unit may mix the first song at maximum volume level with the second song at minimum volume level (e.g. 0, silence), resulting in a mixing ratio (for example, calculated according to the above equation) of 0, or nearly 0, whereas at the end of the transition, the mixing unit mixes the first song at minimum volume level with the second song at maximum volume level, resulting in a mixing ratio (for example, calculated according to the above equation) of 1, or nearly 1. Alternatively, at the beginning of the transition, V2 could have a constant value, even a maximum value, and V1 could be controlled to decrease therefore again increasing the contribution of the second song and thus the mixing ratio in the sense of the present invention.

In between the beginning of the transition and at the end of the transition, the volume level of the first song may continuously decrease, and/or the volume level of the second song may continuously increase. The volume changes may be linear (linear volume function) or may follow any other suitable volume function. The volume functions of the volume levels of the two songs may be different from one another. Furthermore, the volume functions may comprise portions of constant volume. For example, the volume of the second song contain a constant portion of high (even maximum) volume at the start of a transition, while the volume of the first song is decreased as the transition progresses.

The volume levels of the first song and the second song (for example, a current song and adjacent song), respectively may further be set during mixing such that the sum of the first volume level and the second volume level remains constant, in particular equal to the volume level of the first song before starting the transition and/or the volume level of the second song after the end of the transition. Alternatively, or in addition, an audio limiter may be used to avoid the sum volume to exceed a given maximum volume (clipping). In this way, a continuous and uninterrupted volume perception is achieved for the user before, during and after the transition.

In a further embodiment of the present invention, the device may comprise a beats per minute ("BPM")-matching unit configured to adjust the tempo of the current song and/or the adjacent song, such that the current song and the adjacent song have matching BPM values. BPM-matching is required to ensure that both songs are continuously played in synchronization with one another when they are mixed together throughout the transition. In particular, at any point in time during the transition, a current BPM value of the audio data of the current song is kept equal to a current BPM value of the audio data of the adjacent song, wherein this current BPM value can deviate from the respective original BPM values of the two songs and can further change over time, especially during the transition or in connection with the transition (shortly before or after the transition).

More particularly, outside of transitions it is usually preferable that songs are played back at their original BPM values. If the current song and the adjacent song have different original BPM values, a smooth transition from the current song to the adjacent song can be achieved by continuously changing the current BPM value of the audio data currently played back from the original BPM value of the current song to the original BPM value of the adjacent song. The current BPM value may be changed in accordance with a change of the mixing ratio A during the transition. Also, a change of the current BPM value may start before or after the start of the change of the mixing ratio, and it may end before or after the end of the change of the mixing ratio. Furthermore, a change rate at which the current BPM value is changed is preferably smaller than a predetermined maximum change rate and/or is set to depend on a current change rate of the mixing ratio and/or on a detected position or speed of the user's finger during the swiping gesture. In this manner, interruption of the flow of music is diminished and deviation of the current BPM value from the original BPM values of the songs is reduced even when there is a major BPM difference (e.g. +−10% or more) between the songs.

In a further preferred embodiment of the present invention, the device may comprise a pitch shifting unit configured to shift the pitch of the current song and/or the adjacent song such that the current song and the adjacent song have matching keys. It has been found out that a transition between two songs and a mixture of two songs will be perceived as better preserving the flow of music if both songs have matching keys. In the sense of the present invention, matching keys refer to situations in which two songs, at a time a transition is to be played, are in the same key (equal keys), or if one song is in the parallel minor key or the parallel major key of the other song, or if the keys of the two songs are neighbors in the circle of fifth (such as C major and F major). In particular, even if the keys of the two songs are not equal but still at neighboring positions in the circle of fifth, it has been found out that mixing both songs results in a perceived consonance, thus allowing to smoothly transition between the songs.

If the two songs do not have matching keys in their original version, according to the above-described embodiment of the invention, a pitch shifting unit may be used to shift the pitch of either of the songs in such a manner as to achieve matching keys between the two songs. In order to avoid a sudden pitch change, which may sound unpleasant, preferably the pitch of the adjacent song is shifted such that the adjacent song is transformed to a key that matches the current song, wherein the pitch shift is performed either before the start of the transition or during the transition (preferably near the beginning portion of the transition when the contribution of the adjacent song to the mix is low). Any conventionally known method or technology for shifting the pitch of a song, preferably without changing the tempo of the song, may be used for this purpose. To avoid strong pitch shifts, the above described concept of matching keys may be implemented by performing a smart pitch shift. In a smart pitch shift, the pitch of one song is shifted such that its key either equals the key of the other song (or the parallel minor or the parallel major of the other song), or equals a neighboring key in the circle of fifth, whichever alternative requires the smaller pitch shift, i. e. a pitch shift of a smaller interval. If both alternatives require a pitch shift over substantially the same interval (for example +/−2 semitones), preference may be given to the pitch shift where both songs have the same key or parallel minor or parallel major keys.

Upon detection of a start of a swiping gesture and therefore initiating a transition from the current song towards an adjacent song, (i.e., the mixing unit starts to mix audio data of the current song with audio data of the adjacent song), playback of the adjacent song may be started at a playback position within a region around a target playback position. The target playback position may be set to the beginning of the adjacent song, or to the first beat of the first bar, or to a predetermined relative position within the adjacent song (for example 30% of the playback duration of the adjacent song), or to a cue point (manual starting point) defined by a user within the adjacent song.

In a further embodiment of the present invention, the target playback position may be set to the beginning (first beat of the first bar) of a song section different from a starting song section of the adjacent song. In particular, the device may comprise a song section detection unit configured to detect song sections of the songs, in particular the adjacent song, and the playback unit may start, upon detection of the swiping gesture by the user input unit, playback of the adjacent song at a position within a region around a target playback position, the target playback position corresponding to the beginning of a predetermined song section of the adjacent song, said predetermined song section being different from the starting song section of the adjacent song.

Song sections in the sense of the present disclosure are typical parts of a song, such as intro, verse, bridge, chorus, drop, build-up, interlude, outro etc. Although not all music is structured by using such song sections, at least some of the above song section examples can be identified in most songs, especially in western music. Technologies known as such in the prior art may be used in embodiments of the present invention for determining song sections, for example, a technology as described in US2021/0326102A1, which uses an artificial intelligence-based source separation algorithm to generate decomposed tracks representing the individual instrumental or vocal timbres included in the song. The decomposed tracks are obtained by processing the audio data of the song using a trained neural network. By analyzing individual decomposed tracks and deriving rhythm information or harmonic information therefrom, for example, the algorithm is capable of identifying typical musical patterns indicating the presence of such song sections. Other technologies known in the art may be used in embodiments of the present invention, which analyze a beat grid of the music and/or a chord progression, all of which may form clues for determining song sections. In particular, conventional AI based algorithms using neural networks/models trained specifically to detect song sections (or cue points), or segment detection based on conventional digital signal processing may be used here.

According to the above described embodiment, upon detecting a swiping gesture of the user and therefore initiating a transition from the current song towards an adjacent song (i. e. the mixing unit starts to mix audio data of the current song with audio data of the adjacent song), the device is configured to start playback of the adjacent song, at a playback position within a region around the target playback position, said target playback position being different from the starting position/beginning of the adjacent song, and is rather set to the beginning of a song section different from the starting song section. Consequently, the adjacent song, when mixed with the current song during the transition or played as the new current song after completing the transition, has started not at the very beginning, for example, not with the intro section of the song, but at a suitable point in time in the middle of the song, for example, at the beginning of a chorus or a verse. In general, it may be preferred to set the target playback position of the adjacent song to the beginning of a song section with higher energy such as a chorus or another song section that is characteristic of the song.

As a result, an interruption of the flow of music may be avoided upon a transition from the current song to the adjacent song, because in particular an intro section of a song which usually has less musical energy or reduced volume/intensity, is skipped and the adjacent song can be started at a target playback position with higher musical energy/intensity. For example, when using the present invention to browse through a playlist or a music library by continuously performing a forward swiping gesture or a reverse swiping gesture, a user may quickly jump from chorus to chorus along the sequence of songs, or from verse to verse.

As described above, when a transition is initiated, playback of the adjacent song may not necessarily be started exactly at the target playback position, but at a position within a region around the target playback position. This region may be a neighborhood of the target playback position having a size of, for example, equal to or less than 2 bars. In other words, while the target playback position defines a rough target for the start of playback of the adjacent song, the precise (actual) playback position at which the adjacent song is played and mixed with the current song during the transition may be adjusted more precisely within said region around the target playback position in order to synchronize timing between the songs and improving the audible result of the mix between the current song and the adjacent song.

More specifically, in a preferred embodiment of the invention, the device may comprise a beat matching unit configured to set or adjust an actual playback position of the adjacent song within said region around the target playback position such that the current song and the adjacent song have matching beat phase. Beat phase refers to the relative playback position within the current bar of a song which is typically expressed as a normalized value between 0 and 1. It can be calculated as the playback position within a bar (in beats−1) divided by the total beats per bar (e.g. 4 total beats in a song that has a 4/4 time signature). A beat phase of 0.0 may correspond to the very beginning of a bar (i.e., the first beat), while a beat phase of 1.0 may represent the start of the next bar. The beat phase progresses continuously as the song plays and resets to 0.0 at the beginning of each new bar. Two songs are considered to have matching beat phase when their beat phases are substantially aligned (+−a small deviation tolerance), for example, when the first beat of a bar in the current song coincides with the first beat of a bar in the adjacent song. This alignment ensures rhythmic synchronization between the two tracks.

Therefore, in a situation in which a transition is initiated by the user (swiping gesture is started) and playback of the adjacent song is going to be started at a position within a region of the target playback position, the beat phase of the adjacent song may then be slightly adjusted by an amount less than one or two bars, such that the beat phase of the adjacent song matches that of the current song. As a result, beat matching as described above allows both songs to play at exactly or substantially the same beat phase, i.e. in perfect or audibly perfect beat sync (e.g., deviance below 5 milliseconds).

For example, if a transition is initiated by the user (swiping gesture is started) at a point in time when the current song is played at an actual playback position different from a first beat of a bar, for example at 2% beats (or a beat phase of 0.3125), the actual playback position of the adjacent song may be set or adjusted to the same beat phase, in the example to 2¼ beats.

If playback of the adjacent song has already been started and beat phases of the two songs do not match, the beat matching unit may temporarily increase or decrease the current BPM value of the adjacent song until matching beat phase of the two songs is established (such as in a method known as pitch bending or tempo nudging). Furthermore, if playback of the adjacent song has not yet been started, start of playback of the adjacent song may be delayed (i.e., delaying a start time at which the mixed audio data start to include an audible contribution of the audio data of the adjacent song during a transition may be delayed) until the current song reaches a playback position that matches the beat phase of a start playback position of the adjacent song. For example, if a start playback position of the adjacent song is at the first beat of a bar whereas the current playback position of the current song is at the 4th beat of the current bar, then the start of the adjacent song may be delayed by 1 beat so as to ensure the beat phase aligns right with the current song when the adjacent track starts playing. In this case no position or tempo modification is needed to achieve matching beat phase.

In a further embodiment of the present invention, the device may set or reset a target playback position of the adjacent song to the beginning of the adjacent song or to the beginning of said predetermined song section according to the embodiment explained above, when the audio mixing ratio between the adjacent song and the current song is zero and a swiping gesture towards the adjacent song is detected. An audio mixing ratio of 0, or substantially 0, while detecting a swiping gesture (a beginning swiping gesture) refers to a situation where the swiping gesture and thus the transition from the current song to the adjacent song has just started, i.e., the device is at a starting point of a transition. That means that the audio mixing unit is mixing audio data of the adjacent song with audio data of the current song with increasing contribution of the adjacent song as the transition progresses with a progressing swiping gesture. Thus, when starting the transition, it is not only advantageous to set the target playback position of the adjacent song to the beginning of the adjacent song or to the beginning of the predetermined song section of the adjacent song, but also the target playback position of the adjacent song may be reset to the beginning of the adjacent song or reset to the beginning of the predetermined song section after a previous first swiping gesture, i.e., when playback of audio data of the adjacent song had already started, but the first swiping gesture was interrupted before the transition to the adjacent song was completed or the user even choses to swipe in an opposite direction back towards the current song. In such situation, as soon as the user starts a second swiping gesture towards the adjacent song, the target playback position of the adjacent song will be reset to the beginning of the adjacent song or to the beginning of the predetermined song section, which allows the user to repeat starting the transition to the same position of the adjacent song as during the first swiping gesture.

In a scenario in which a user reverses the swiping direction in the middle of a swiping gesture (i.e., before transition to the adjacent song is completed) such as to command returning towards the current song, the mixing ratio is preferably changed in a continuous manner in line with the continuing reverse swiping gesture such as to reduce the contribution of the adjacent song and increase the contribution of the current song. Only after the mixing ratio has fully or substantially fully returned to a value such as to exclusively or almost exclusively play the current song (for example mixing ratio zero or substantially zero), the target playback position of the adjacent song will be reset as described above, either immediately or later, but before performing the next transition. Other gestures may be detected such as a fast swiping gesture as explained further below, which may initiate an automatic transition in forward or reverse direction at a predetermined finite change rate (smaller than a predefined maximum change rate) for changing the mixing ratio.

In embodiments of the present invention, a single swiping gesture may be sufficient to perform a complete transition from the current song to the adjacent song. Furthermore, in some embodiments of the present invention, the device may be configured to

- play the current song or play the mixed audio data such that only the current song is audible,
- upon detection of a first occurrence of a predetermined swiping gesture, perform a transition to an intermediate state in which mixed audio data are played with substantially equal contributions of both songs, i.e., the current song and the adjacent song, in particular with an audio mixing ratio between 30% and 70%, preferably at about 50%,
- maintain the intermediate state during a time period in which no occurrence of the predetermined swiping gesture is detected, and
- upon detection of a second occurrence of the predetermined swiping gesture, change song selection from a current song to the adjacent song.

The intermediate state is then continued stably, which allows the user to release the swiping gesture and to carry out other control operations while mixed audio data are continued to be played back. This may in particular be used in applications where playback of the mixed audio data is utilized for specific artistic reasons or if the mixed audio data are further modified by audio effects.

In another embodiment of the present invention, wherein the user input unit may be configured to detect at least a predetermined forward swiping gesture, wherein the user's hand is moved in a predetermined forward swiping direction, wherein repeated detection of the forward swiping gesture results in a consecutive selection of a next song of the three or more songs along a forward direction of the sequence, and to detect at least a predetermined mix input from the user, which is different from the forward swiping gesture, wherein the device is configured to enter an intermediate state in which mixed audio data are played with an audio mixing ratio between the next song and the current song from 30% to 70%, preferably about 50%, upon detection of the mix gesture, then maintain the intermediate state during a time period in which no gesture is detected, and then change song selection from a current song to the next song upon detection of the forward swiping gesture. In this embodiment, again, a single swiping gesture is sufficient to carry out a complete transition from the current song to the adjacent song, wherein a stable intermediate state may nevertheless be achieved which allows the user to perform other control operations during playback of the mixed audio data.

In a further embodiment of the present invention, the user input unit may be configured to detect at least a predetermined forward swiping gesture, wherein the user's hand is moved in a predetermined forward swiping direction, wherein repeated detection of the forward swiping gesture results in a consecutive selection of a next song of the three or more songs along a forward direction of the sequence, and my further be configured to detect a predetermined control input from the user, which is different from the forward swiping gesture, wherein the device, upon detection of the predetermined control input, is configured to perform at least one of the following operations: (1) writing an identification of the current song to a playlist (such as adding the current song to favorites, marking or categorizing the current song), (2) skipping the next song and designating the next but one song along the sequence of songs to be the next song (note that the skipped song may either be skipped only for the next transition upon the next forward swiping gesture or may permanently be removed from the sequence of songs), (3) applying an audio effect to at least one of the current song and the next song (such as adding DJ effects, e.g., reverb, chorus, flanger, delay, high-pass filter, low-pass filter, equalizer), (4) entering an effect setting mode in which subsequent user input is accepted for selecting or changing parameters of at least one audio effect to be applied to at least one of the current song and the next song (e.g. opening a control tab or control area on the display of the device where a user may be given options to select audio effects or control effect parameters such as a cut-off frequency of a high-pass filter or a low-pass filter, or the frequency of a delay effect). In this way, additional functions are available for the user to modify playback of the songs and organize the sequence of the songs, while a simple and intuitive forward browsing or reverse browsing through the sequence of songs by repeated swiping gestures is still maintained.

When entering an effect setting mode in the embodiment above, a control area may be displayed which allows two-dimensional touch gestures similar to a track pad, wherein swiping or touching gestures along two perpendicular axis of the control area may control effect parameters of two different audio effects which are simultaneously applied to the audio data. For example a first axis may be associated with a control of effect intensity (wet/dry ratio), while a second axis may be associated with a control of cut-off frequency of a high-pass filter.

In a further embodiment of the present invention, the device may be configured to continuously change the audio mixing ratio between the adjacent song and the current song depending on the position of the user's hand, wherein when the user input unit detects a swiping gesture of a user's hand in which a swiping speed exceeds a predetermined threshold value (fast swiping gesture), the device is configured to perform an automatic transition by continuously changing the audio mixing ratio between the adjacent song and the current song from its current value to 100 percent, wherein a change rate of the audio mixing ratio is set to a predetermined maximum transition change rate, which in particular is lower than a transition speed that would correspond to the actual swiping speed of the user's hand. The user may therefore command an automatic transition from the current song to the adjacent song by using a fast swiping gesture over a shorter movement distance, which further simplifies and accelerates the operation for browsing, while still being capable of precisely carrying out a slower transition by manually controlling the mixing ratio through a slower swiping gesture over a larger movement distance.

In another embodiment of the present invention, the device may further comprise an effect unit which is configured to apply an audio effect to at least one of the current song and the adjacent song, wherein at least one effect parameter is set to be dependent on the audio mixing ratio. Application of an audio effect which depends on the mixing ratio, such as to progress or develop continuously and in synchronization with the change of the mixing ratio, may further help to preserve the musical flow and the continuity of the musical energy during the transition. As known as such in the field of DJ applications, specific audio effects such as reverb, delay, high-cut, low-cut or other equalizer effects, etc., may significantly contribute to obtaining transitions between songs which are perceived as a pleasant or even an exciting part of musical entertainment rather than as an interruption or break of musical continuity. In the embodiment described above, automatic or semi-automatic application of such audio effects depending on the mixing ratio allow to carry out sophisticated DJ transitions by virtue of a simple swiping gesture.

According to another embodiment of the present invention, the device may further comprise a visualization unit configured to provide video data in association with particular songs, wherein the video data represent video information to be displayed on a display of the device, and wherein the playback unit may be configured to playback video data of a song on a display of the device in correspondence and synchronization with playback of the audio data of the same song through an audio output of the device. The visualization unit may be configured to provide mixed video data by mixing video data of the current song with video data of the adjacent song using a video mixing ratio, and the playback unit may be configured to playback the mixed video data on the display in correspondence and synchronization with playback of the mixed audio data. Therein, wherein the video mixing ratio and the audio mixing ratio may have the same or corresponding values.

Note that video data according to the present disclosure may comprise any visual content that can be displayed in association with a particular song, including conventional video content (i.e. sequences of moving images), as well as static visual content such as a single still image or a series of still images (e.g., album artwork, photos, or other related visuals). Video data may be generated, for example based on the audio data of the song, or may be prestored/streamed data associated with the song (for example in the case of music videos).

A device of such configuration may thus play audio data as well as video data, if available, of each song. When the user performs a swiping gesture and the device performs a transition from the current song to the adjacent song, a transition of the video data is performed and displayed in correspondence and synchronization with the transition of the audio data. The user will therefore receive visual feedback which matches the audible perception of the transition.

Mixing of the video data of the current song with the adjacent song may, for example, involve splitting the image to be displayed into a first area showing video data of the current song and a second area showing video data of the adjacent song, wherein relative size of the first area and the second area (for example, a ratio between the second area and the first area) may be set according to the video mixing ratio, in particular according to or corresponding to the audio mixing ratio. In one embodiment, the image formed by the mixed video data is moved across the display in conformity with the movement of the users hand across the display, i. e. the user may drag the image across the screen during the swiping gesture, wherein portions of video data of the current song as well as video data of the adjacent song are displayed concurrently during the transition.

Alternatively, mixed video data may be formed by partial transparency of one or both of the video data of the current song and the adjacent song such that, during a transition from the current song to the adjacent song, video data of the current song and video data of the adjacent song are displayed in an overlaid manner in the same display area. In such embodiment, a degree of transparency of the video data may be adjusted and set in accordance with the video mixing ratio. In general, it is preferred that the video data of the current song are predominantly or exclusively visible at the beginning of a transition, whereas the video data of the adjacent song are predominantly or exclusively visible at the end of the transition.

According to another embodiment of the present invention, the device may comprise a decomposition unit configured to decompose audio data of a song such as to obtain at least one decomposed track of audio data representing at least one, but not all, of the musical timbres included in the song, wherein the mixing unit is configured to obtain the mixed audio data by mixing the at least one decomposed track with other audio data of the current song or the adjacent song. It is known as such in the prior art, for example, from U.S. Pat. No. 11,216,244 or US2021/0326102A1, that creation of smooth and pleasant transitions between songs can be greatly enhanced by using a trained neural network to decompose the original audio data of the songs, such as to obtain separate tracks containing several instrumental components or vocal components that make up the song, and by then cross-fading between decomposed tracks of the current song and decomposed tracks of the adjacent song in such a manner that different decomposed tracks are treated differently during the transition. For example, when playing a transition between two songs which both have vocal components and instrumental components, fading out the decomposed vocal track(s) of the first song first, while the decomposed instrumental track(s) are continued to be played, then carrying out a transition between only the decomposed instrumental tracks of the two songs, and thereafter, fading in the decomposed vocal track(s) of the second song may achieve an especially well-sounding transition without interruption of the musical flow or a sudden change of the musical characteristics, in particular as any clashing of different vocals can be avoided.

In a further embodiment of the present invention, the device may comprise at least three memory areas, capable of storing audio data of a current song, a previous song in the sequence of songs, and a next song in the sequence of songs, wherein the device may be configured to overwrite at least one of the three memory areas by audio data of a fourth song of the sequence of songs when the song selection unit changes song selection from the current song to either the previous song or the next song, said fourth song being different from the current song, the previous song and the next song. By providing at least three memory areas and simultaneously storing audio data of different songs of the sequence of songs in those memory areas, the audio data of the two adjacent songs of the current song (the next song and the previous song along the sequence of songs) may concurrently be stored and processed during playback of the current song, such that the required data are readily available as soon as the user starts whichever swiping gesture towards either a forward direction or a reverse direction. This advantage is particularly relevant if the audio data of the songs are to be further processed for the purpose of mixing, for example, in the embodiment described above, which uses a decomposition unit for decomposing the audio data to obtain several decomposed tracks.

According to a second aspect of the present invention, the above object is achieved by a method for playing audio data, comprising the steps of providing audio data of a sequence of three or more songs, selecting a current song in the sequence for playback, and playing audio data of at least the current song, wherein the method further comprises detecting a predetermined swiping gesture of a user and changing song selection from the current song to an adjacent song in the sequence each time the swiping gesture is detected, such that repeated detection of the swiping gesture results in a consecutive selection of the three or more songs along the sequence, and wherein the method further comprises setting an audio mixing ratio between the adjacent song and the current song based on a position of the user's hand during the detected swiping gesture, and/or changing the audio mixing ratio in a continuous manner upon detection of the swiping gesture; obtaining mixed audio data by mixing audio data of the current song with audio data of the adjacent song using the audio mixing ratio; and playing the mixed audio data when the swiping gesture is detected.

With the method of the second aspect of the invention and its embodiments described below, the same or corresponding effects will be achieved as with the device of the first aspect of the invention and its embodiments described above.

In an embodiment of the invention, the method may comprise the steps of detecting at least a forward swiping gesture, wherein the users hand is moved in a predetermined forward swiping direction, and detecting a reverse swiping gesture, wherein the user's hand is moved in a predetermined reverse swiping direction that is opposite to the forward swiping direction, wherein repeated detection of the forward swiping gesture results in a consecutive selection of a next song of the three or more songs along a forward direction of the sequence, and wherein repeated detection of the reverse swiping gesture results in a consecutive selection of a previous song of the three or more songs along a reverse direction of the sequence.

In an embodiment of the invention, the audio mixing ratio between the adjacent song and the current song may be set to continuously change depending on the position of the user's hand such as to increase when the users hand moves along a predetermined swiping direction corresponding to a change of song selection from the current song to the adjacent song, and to decrease when the users hand moves along a direction opposite to the predetermined swiping direction.

In an embodiment of the invention, the method may comprise a step of adjusting the tempo of the current song and/or the adjacent song such that the current song and the adjacent song have matching BPM, and/or the method may comprise a step of shifting the pitch of the current song and/or the adjacent song such that the current song and the adjacent song have matching keys. Furthermore, the method may comprise a step of beat matching for setting or adjusting an actual playback position of the adjacent song within a region of a target playback position such that the current song and the adjacent song have matching beat phase as described in more detail above. In particular, as mentioned above, "adjusting" may be achieved by skipping audio frames (instantly jumping to a different playback position), playing back audio frames at accelerated or decelerated rate, or generating silence frames ("waiting").

In an embodiment of the invention, the method may comprise a step of detecting song sections of the songs, wherein, upon detection of the swiping gesture, playback of the adjacent song is started at a position corresponding to the beginning of a predetermined song section of the adjacent song, said predetermined song section being different from the starting song section of the adjacent song.

In an embodiment of the invention, the method may comprise the step of resetting a target playback position of the adjacent song to the beginning of the adjacent song or to the beginning of the predetermined song section as defined in the above embodiment, when the audio mixing ratio between the adjacent song and the current song is zero and a swiping gesture towards the adjacent song is detected.

In an embodiment of the invention, the method may comprise the steps of (1) playing the current song or playing the mixed audio data with an audio mixing ratio of zero, (2) upon detection of a first occurrence of a predetermined swiping gesture, perform a transition to an intermediate state in which mixed audio data are played with an audio mixing ratio between 30% and 70%, preferably about 50%, (3) maintaining the intermediate state during a time period in which no occurrence of the predetermined swiping gesture is detected, and (4) upon detection of a second occurrence of the predetermined swiping gesture, changing song selection from a current song to the adjacent song.

In an embodiment of the invention, the method may comprise the steps of detecting a predetermined forward swiping gesture, wherein the users hand is moved in a predetermined forward swiping direction, wherein repeated detection of the forward swiping gesture results in a consecutive selection of a next song of the three or more songs along a forward direction of the sequence, and detecting a predetermined mix input from the user, which is different from the forward swiping gesture, wherein the method is configured such as to enter an intermediate state in which mixed audio data are played with an audio mixing ratio between the next song and the current song from 30% to 70%, preferably about 50%, upon detection of the mix gesture, then maintain the intermediate state during a time period in which no gesture is detected, and then change song selection from a current song to the next song upon detection of the forward swiping gesture.

In an embodiment of the invention, the method may comprise the steps of detecting a predetermined forward swiping gesture, wherein the user's hand is moved in a predetermined forward swiping direction, wherein repeated detection of the forward swiping gesture results in a consecutive selection of a next song of the three or more songs along a forward direction of the sequence, and detecting a predetermined control input from the user, which is different from the forward swiping gesture, wherein, upon detection of the predetermined control input, the method is configured to perform at least one of the following operations: writing an identification of the current song to a playlist, skipping the next song and designating the next but one song along the sequence of songs to be the next song, applying an audio effect to at least one of the current song and the next song, and entering an effect setting mode in which subsequent user input is accepted for selecting or changing parameters of at least one audio effect to be applied to at least one of the current song and the next song In an embodiment of the invention, the method may be configured to continuously change the audio mixing ratio between the adjacent song and the current song depending on the position of the users hand, wherein when a swiping gesture of a users hand is detected in which a swiping speed exceeds a predetermined threshold value, the audio mixing ratio between the adjacent song and the current song is continuously changed from its current value to 100 percent, wherein a speed of the change of the audio mixing ratio is set to a predetermined maximum transition speed (which is lower than a transition speed that would correspond to the actual swiping speed of the users hand).

In an embodiment of the invention, the method may comprise a step of applying an audio effect to at least one of the current song and the adjacent song, wherein at least one effect parameter is set to be dependent on the audio mixing ratio.

In an embodiment of the invention, the method may comprise the steps of providing video data in association with particular songs, wherein the video data represent video information to be displayed on a display, playing video data of a song on a display in correspondence and synchronization with playback of the audio data of the same song, wherein the method may further provide mixed video data by mixing video data of the current song with video data of the adjacent song using a video mixing ratio, wherein the mixed video data are played as video data on a display in correspondence and synchronization with playback of the mixed audio data, and wherein the video mixing ratio and the audio mixing ratio preferably have the same or corresponding values.

In an embodiment of the invention, the sequence of song may comprise, subsequently along the sequence of songs, in this order, a first song, a second song, a third song, a fourth song, and a fifth song, wherein the method may comprises the steps of (1) storing audio data of the second song of the sequence of songs in a first memory area, (2) storing audio data of the third song of the sequence of songs in a second memory area, (3) storing audio data of the fourth song of the sequence of songs in a third memory area, (4) setting the third song as the current song and playing audio data of the third song, and (5) detecting either a forward swiping gesture for changing song selection from the third song to the fourth song, or a reverse swiping gesture for changing song selection from the third song to the second song, and wherein, (a) in a case where the forward swiping gesture is detected, the first memory area is overwritten by audio data of the fifth song, and (b) in a case where the reverse swiping gesture is detected, the third memory area is overwritten by audio data of the first song.

In an embodiment of the invention, the method may comprise the steps of decomposing audio data of a song such as to obtain at least one decomposed track of audio data representing at least one, but not all, of the musical timbres included in the song, and obtaining the mixed audio data by mixing the at least one decomposed track with other audio data of the current song or the adjacent song.

Figure 2A:
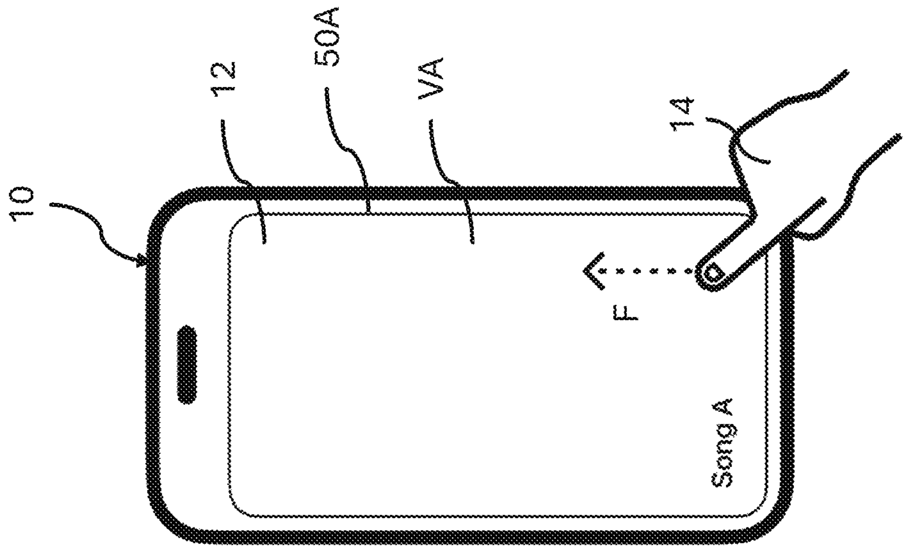
FIGS. 2*a*, 2*b* and 2*c* illustrate a method and the device according to the first embodiment of the present invention.
Figure 2B:
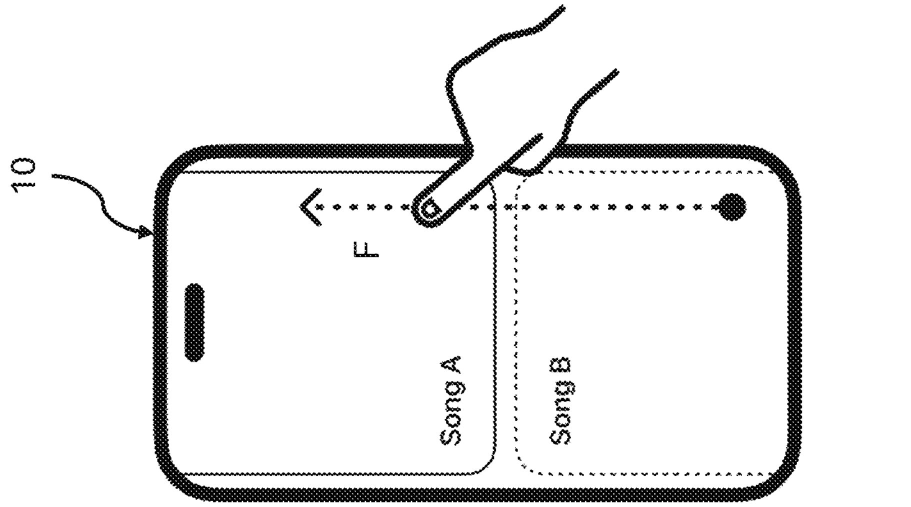
Figure 2C:
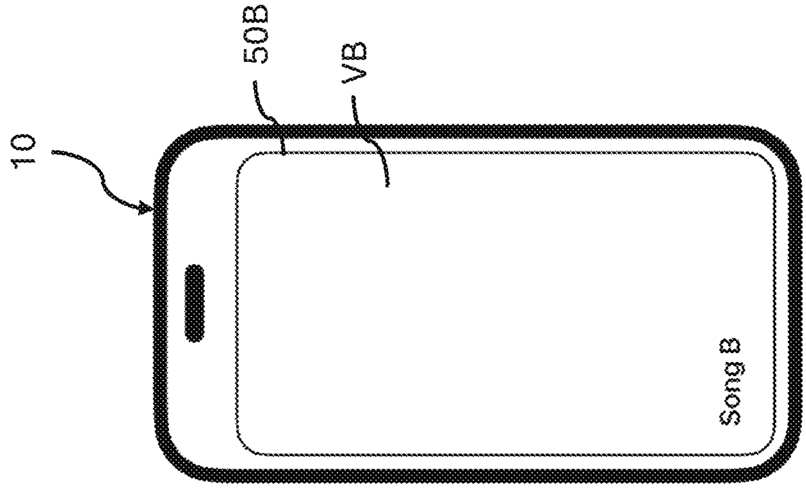

Embodiments of the present invention will now be further explained with reference to the accompanying drawings in which FIG. 1 is a schematic illustration of a device according to a first embodiment of the present invention, FIGS. 2*a*, 2*b* and 2*c* illustrate a method and the device according to the first embodiment of the present invention, wherein FIG. 2*a* illustrates a state at a beginning of a forward transition, FIG. 2*b* shows a state amid the forward transition, and FIG. 2*c* shows a state at an end of the forward transition.

Figure 3C:
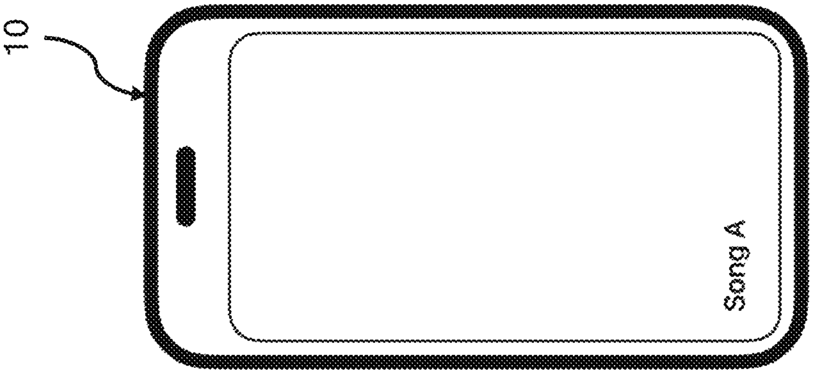
FIGS. 3*a*, 3*b* and 3*c* illustrate the method and the device of the first embodiment of the invention.
Figure 3B:
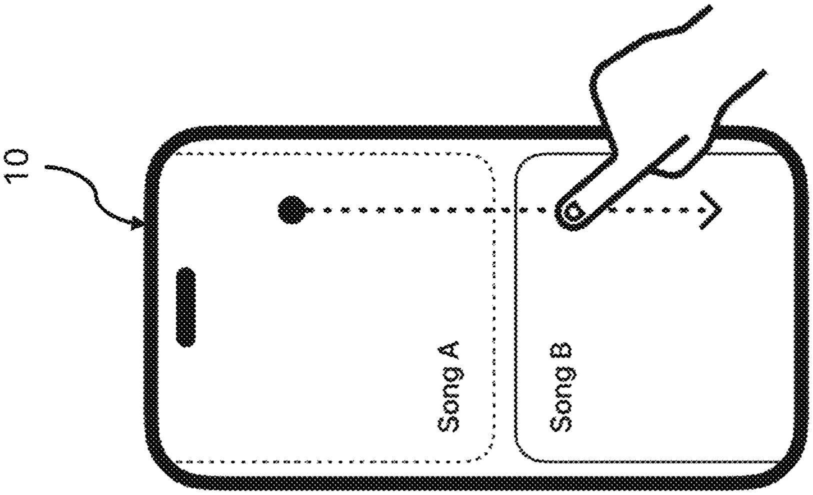
Figure 3A:
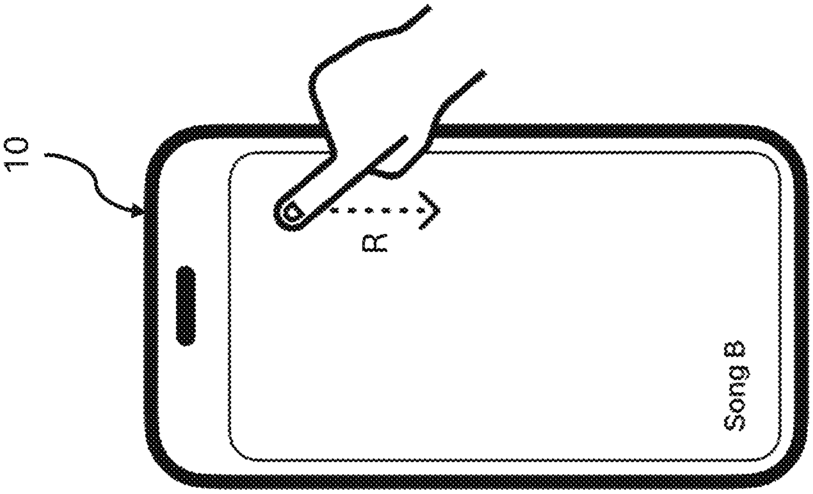
Figure 4C:
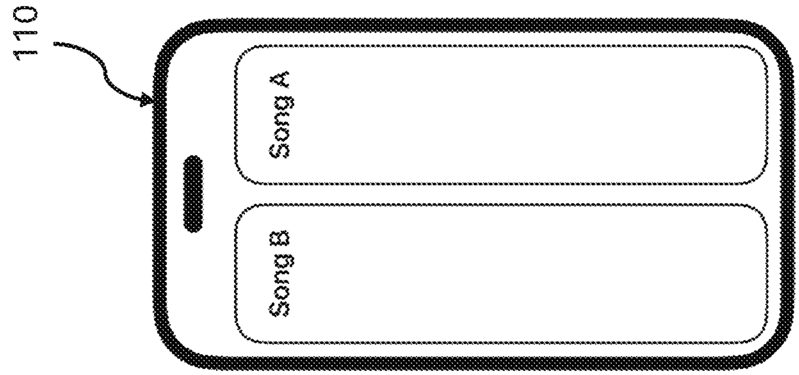
FIGS. 4*a*, 4*b* and 4*c* illustrate a method and a device according to a second embodiment of the present invention.
Figure 4B:
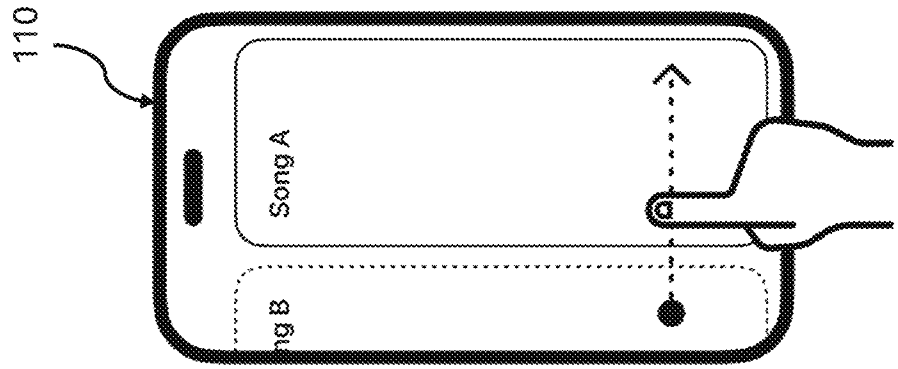
Figure 4A:
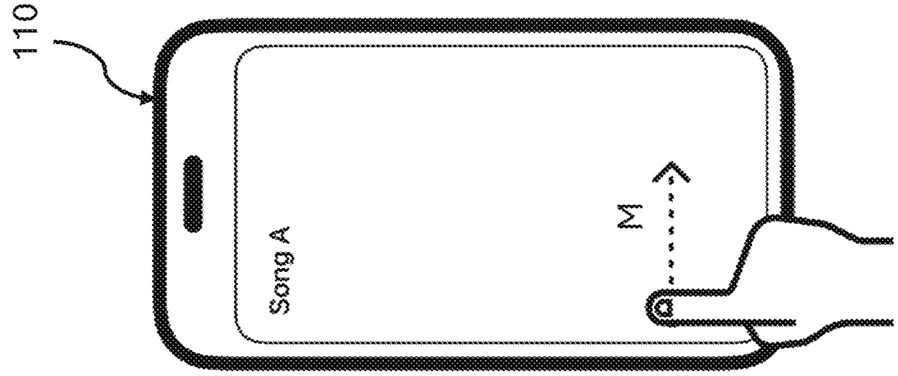
Figure 5C:
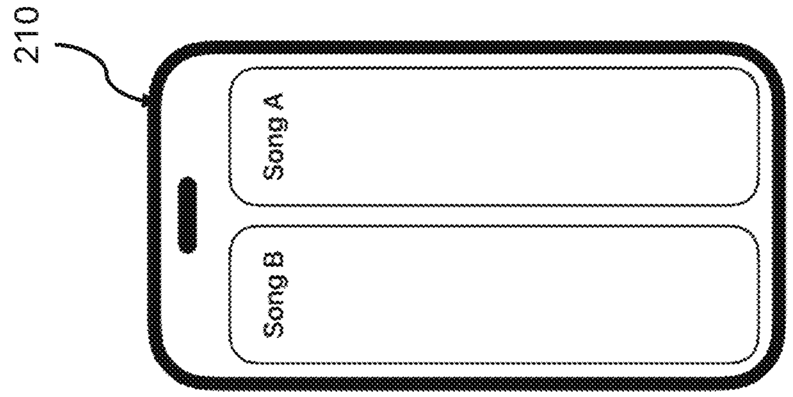
FIGS. 5a, 5b and 5c illustrate a method and a device according to a third embodiment of the present invention.
Figure 5B:
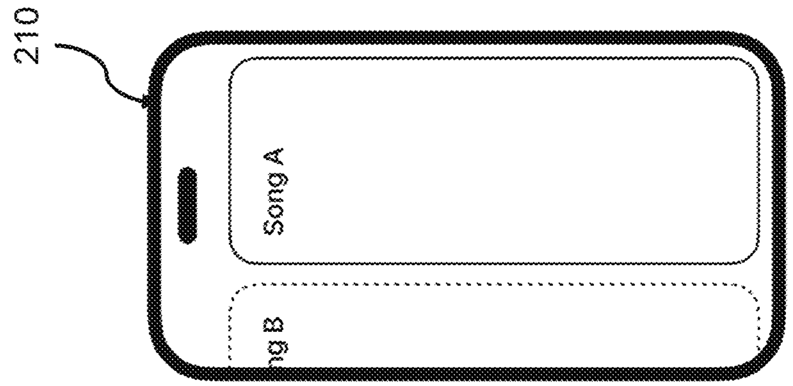
Figure 5A:
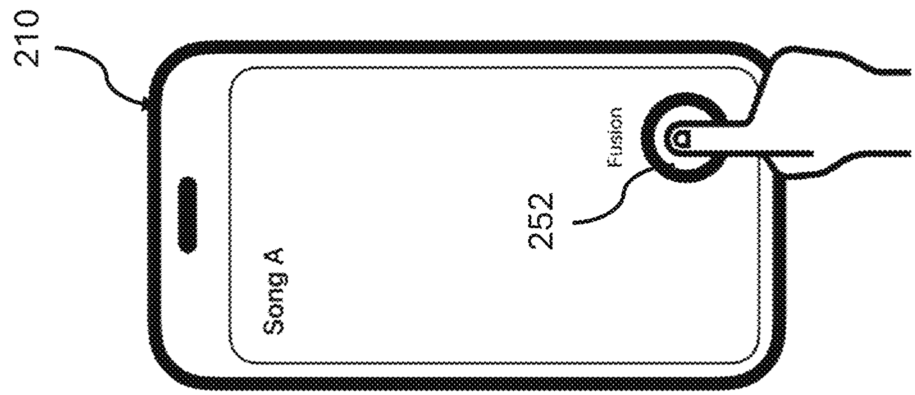
Figure 6A:
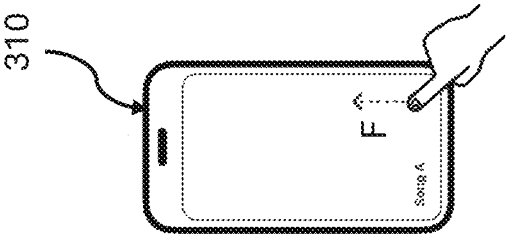
FIGS. 6a to 6f illustrate a method and a device according to a fourth embodiment of the present invention.
Figure 6B:
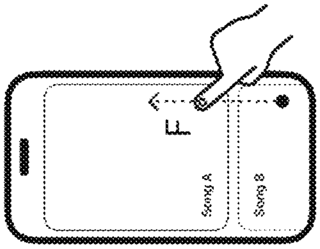
Figure 6C:
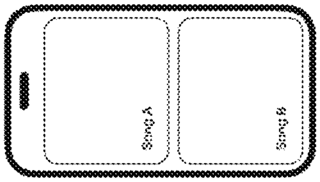
Figure 6D:
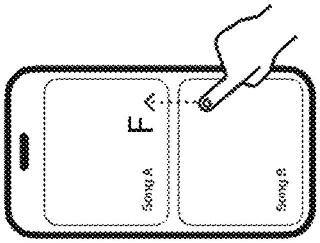
Figure 6E:
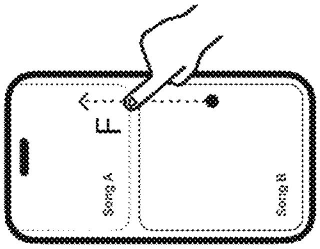
Figure 6F:

FIGS. 3*a*, 3*b* and 3*c* illustrate the method and the device of the first embodiment of the invention, wherein FIG. 3*a* shows a state at a beginning of a reverse transition, FIG. 3*b* shows a state amid the reverse transition, and FIG. 3*c* shows a state at an end of the reverse transition, FIGS. 4*a*, 4*b* and 4*c* illustrate a method and a device according to a second embodiment of the present invention, wherein FIG. 4*a* shows a state at a beginning of a transition, FIG. 4*b* shows a state during a swiping gesture towards an intermediate state, and FIG. 4*c* shows the intermediate state, FIGS. 5*a*, 5*b* and 5*c* illustrate a method and a device according to a third embodiment of the present invention, wherein FIG. 5*a* illustrates a state at a beginning of a transition, FIG. 5*b* shows a state during a change to an intermediate state, and FIG. 5*c* illustrates the intermediate state, FIGS. 6*a* to 6*f* illustrate a method and a device according to a fourth embodiment of the present invention, wherein FIG. 6*a* illustrates a state at a beginning of a transition, FIG. 6*b* illustrates a state after initiating the transition, FIG. 6*c* illustrates an intermediate state, FIG. 6*d* illustrates a user operation during the intermediate state, FIG. 6*e* illustrates a swiping gesture starting from the intermediate state towards an end of the transition, and FIG. 6*f* illustrates a condition at the end of the transition.

The basic components of a device 10 according to the first embodiment of the present invention will now be explained with reference to FIG. 1.

A device 10 of the first embodiment is an electronic device such as a smartphone, a tablet computer or any other computer, which includes a touch sensitive display 12 (a touch screen) capable of accepting user input through a hand of the user, in particular through a users finger which touches the display 12 at various positions or performs swiping gestures along the surface of the display 12 in a manner as conventionally known as such. In addition to display 12, device 10 comprises further hardware components such as a processor 16, a non-transitory computer readable medium for storing executable instructions for performing the described operations of the device 10, such as a volatile memory 18 (e.g. RAM) or a non-volatile memory 20 (e.g. ROM), a power supply, in particular a battery 22, a communication module 24 such as a wireless communication module (for example a Wi-Fi module, a Blu-ray module), as well as an audio output module 26 capable of providing audio output based on audio data processed by the processor. The audio output module 26 may comprise an analog-to-digital converter and may provide audio output through built-in speakers 28 of the device 10, through an analog audio output port (AUX) 30 of the device 10. In particular, a device 10 may be connected via audio output port 30 and a cable, or via a wireless connection, to external speakers or headphones. Alternatively, audio data may be transmitted in digital format for playback to an external device such as external speakers or headphones, for example by using communication module 24 of device 10.

For specific DJ setups, the device 10 may comprise a main output channel for outputting audio data in digital or analog format to a main output device, such as a PA, and, in addition, a separate pre-cueing channel to output the same or other audio data in digital or analog format to a separate pre-cueing device such as headphones. This allows a DJ as a user of the device to preview segments, transitions, or upcoming tracks privately, independent of what's currently playing through the main output channel to the PA which is audible by the audience, making it easier and very efficient to find and prepare the next track in the mix.

A device 10 is configured to receive from an external source through its communicating module 24 and/or to store within its internal memory 18 a plurality of different songs in digital format, for example as MP3 files, WAV files or AIFF files. The audio input unit 32 of the device may obtain such music files via conventional music distribution platforms such as Apple Music, Spotify or in any other manner. A software application running on the processor 16 of the device 10 may be capable of organizing the plurality of songs in a sequence of songs such as a playlist, wherein the individual songs of the sequence are arranged in a predefined order. The device may then be capable of playing the songs of the sequence in the predetermined order one after another and may allow a user to browse this sequence by manually switching in a forward direction or in a reverse direction along the sequence of songs in a manner as will be described below in more detailed.

Device 10 may comprise a song selection unit 34 configured to select a particular song from among the sequence of songs as a current song for playback, and a playback unit 36 for playing audio data such as the audio data of the current song. Playback unit 36 may then send the audio data to be played either to audio output module 26 or to communication module 24 for transmission in a digital format.

Device 10 may further comprise a mixing unit 38 capable of mixing audio data of two different songs, in particular audio data of the current song as currently selected by song selection unit 34 with audio data of an adjacent song in the sequence of song, i. e. a song that immediately follows the current song or immediately precedes the current song in this sequence of songs. Mixing unit 38 may store an audio mixing ratio defining relative contributions of the current song and the adjacent song, respectively, in the resulting mixed audio data.

For example, mixing unit 38 may set or modify a particular volume level V1 for the current song and a particular volume level V2 for the adjacent song and then calculate the sum of the audio signals of the current song and the adjacent song as represented by the respective audio data. The sum signal may further be normalized to not exceed a maximum value or to maintain a certain total volume of the audio signal.

The audio mixing ratio as used by mixing unit 38 is set depending on a position of a user's hand during a swiping gesture as detected by a user input unit 35 which is connected to display 12 to receive signals from the display 12 due to a touch gesture of the user. When the user's hand 14 swipes across the surface of display 12 (see also FIGS. 2*a*, 2*b*), such movement of the user's hand 14 is detected and provided as a control signal by user input unit 35 to result in a corresponding change of the audio mixing ratio. More specifically, during the swiping gesture, a continuous change of the position of the user's hand results in a continuous change of the audio mixing ratio in a corresponding manner. The mixing ratio may in particular change instantly or without a noticeable delay (for example a delay below 100 μs), upon moving the finger of the user across the display 12. In other words, the device preferably allows the user to directly control and change the mixing ratio in real-time.

Device 10 may further comprise a BPM matching unit 40 configured to adjust the tempo of a song, for example through any suitable, for example conventional, method, such as sample rate conversion or time stretching, a beat matching unit 41 configured to adjust the beat phase of a song, i.e. a current playback position relative to a beat grid or bar system of the song, and a pitch shifting unit 42 configured to shift the pitch of a song. BPM matching unit 40 may have an additional function of detecting a tempo (BPM value) of a song, beat matching unit 41 may have an additional function of detecting a beat structure or bar system of a song, and pitch shifting unit 42 may have an additional function of detecting a key of a song. BPM matching unit 40 and pitch shifting unit 42 may therefore be operated such as to detect a BPM value and/or key of the current song and of the adjacent song, and then to adjust the BPM value and/or a key of at least one of the current song and the adjacent song such that both songs have matching BPM values and/or matching keys. The pitch shifting unit 42 may in particular be configured for smart pitch shifting as described above.

Note that conventional key detection algorithms such as algorithms integrated in key detection plugins for DAW systems, for example, may be used in embodiments of the invention.

Device 10 may further comprise a song section detecting unit 44 configured to analyze a song and to recognize the presence of specific song sections, typically such as an intro, a verse, a bridge, a chorus, an interlude or an outro. In particular, song section detection unit 44 may deliver a plurality of song positions referring to starting points and end points of such song sections.

Furthermore, device 10 may include an effect unit 46, which may provide at least one, preferably a plurality of different audio effects, which may be applied to the audio data of at least one of the current song and the adjacent song, in parallel or in sequence, in particular before those audio data enter the mixing unit 38 and/or in the course of being processed within mixing unit 38. In addition or alternatively, an effect provided by effect unit 46 may be applied to mixed audio data as processed within or output by mixing unit 38. In addition or alternatively, an effect provided by effect unit 46 may be applied by playback unit 36.

In an embodiment of the invention, selection of one of a plurality of audio effects by effect unit 46 or setting or modifying an effect parameter of an audio effect by effect unit 46 may depend on the audio mixing ratio. Moreover, effect selection or setting or modification of effect parameters by effect unit 46 may depend on a result of an automated analysis of the current song and/or the adjacent song by device 10, such as a detected tempo and/or a detected pitch and/or a detected song section and/or other musical content or characteristics of a song as detected by device 10. In addition or alternatively, effect unit 46 may operate depending on a user input as provided through display 12 and user input unit 35 such that a user can manually select a desired effect from among a plurality of available audio effects or can manually change effect parameters of an audio effect.

Device 10 may further comprise a visualization unit 48 configured to provide video data or mixed video data and send such data to display 12. Visualization unit 48 preferably operates in coordination and synchronization with playback unit 36 such that the video data displayed will match the audio data or mixed audio data played back. In particular, visualization unit 48 is capable of mixing video data from a first song with video data from a second song by using a particular video mixing ratio, which is preferably set to be the same or corresponding to the audio mixing ratio used by mixing unit 38.

Device 10 may further comprise a decomposition unit 47 configured to decompose all audio data of a song and to generate at least one decomposed track (stem) which contains only one or some, but not all, of the instrumental or vocal components of the song, e. g., all the musical timbres which together make up the complete sound of the song. Preferably, decomposition unit 47 includes a trained neural network such as a convolutional neural network (CNN) for processing the audio data of a song and separating therefrom a plurality of decomposed tracks which represent separate tracks for individual instruments or individual vocal components of the song.

When using a decomposition unit 47 as described above, mixing unit 38 is preferably not just mixing the original audio data of two songs, but is mixing decomposed tracks of a first song with decomposed tracks of the second song. Mixing unit 38 is capable of selecting only some, but not all, of the decomposed tracks provided by decomposition unit 47 for each song for generating the mixed audio data, and/or is capable of setting specific volume levels to individual decomposed tracks of any of the songs, or to individually set a change rate for any decomposed track at which a volume of that track changes with time or with change of user input (movement of the hand of the user).

In an example, decomposition unit 47 may decompose the current song to obtain at least one decomposed vocal track which includes all vocal components of the song, and at least one decomposed instrumental track which includes all instrumental components of the song (such as drums, bass, guitars, piano etc.). Likewise, decomposition unit 47 may decompose the audio data of the adjacent song to obtain at least one decomposed vocal track which includes all vocal components of the adjacent song, and at least one decomposed instrumental track which includes all instrumental components of the song. Both decompositions may be complete decompositions such that a sum signal of all decomposed vocal and instrumental tracks of the current song will sound equal to the original audio data of the current song, and a sum signal of all decomposed vocal and instrumental tracks of the adjacent song will sound equal to the original audio data of the adjacent song. In such example, mixing unit 38 may perform a transition from the current song to the adjacent song, i. e. from a state at which device 10 plays only audio data of the current song towards a state at which device 10 plays only audio data of the adjacent song by continuously cross-fading between the songs according to a continuously changing mixing ratio which depends either on a position of a users hand during a swiping gesture as detected by user input unit 35, or depends on time. Mixing unit 38 may then utilize the decomposed tracks as generated by decomposition unit 47 to better preserve the musical flow by first decreasing the volume of the decomposed vocal tracks of the current song to zero or nearly zero and then starting to increase the volume of the decomposed vocal tracks of the adjacent song such that simultaneous playback of vocal components of both songs is avoided or significantly reduced. At the same time, the decomposed instrumental tracks of both the current song and the adjacent song are maintained at a higher level or even a full level during the entire transition, i.e. are overlaid and mixed, such as to maintain the overall musical energy and avoid a break of the musical flow.

Furthermore, any of tempo detection by BPM matching unit 40 and/or beat phase detection by the beat matching unit 41 and/or pitch detection by pitch shifting unit 42 and/or song section detection by song section detection unit 44 may utilize an analysis of one or more decomposed tracks as provided by decomposition unit 47.

For example, pitch detection may be improved by separately analyzing a decomposed bass track and tempo or song section detection may be improved by separately analyzing a decomposed drum track.

Furthermore, in embodiments using a decomposition unit 47, effect unit 46 may be operated to apply one or more audio effects individually to particular decomposed tracks, but not in the same way to all decomposed tracks of a song.

A method for operating device 10 according to the first embodiment of the present invention will now be further explained with reference to FIGS. 2*a* to 3*c*. In a state as shown in FIG. 2*a*, a song A is selected for playback such that substantially only audio data of song A are audible. A user may then start a swiping gesture by touching display 12 with a finger of his hand 14, wherein at the beginning of the swiping gesture or, i. e. when the finger has touched the display 12 but has not yet started moving across the display 12, the current song is continued to be played as the only audible sound. When the user then swipes in a predetermined direction such as in an upward direction as shown in the illustrated embodiment, for example, which here is a forward swiping direction F, device 10 recognizes that a transition is to be performed from the current song to a next song along the sequence of songs, here a song B. Any specific other direction could alternatively be defined and configured as the forward swiping direction, such as a horizontal direction from right to left. Concurrently with the movement of the user's finger across display 12, a mixing ratio between the next song and the current song is set at which audio data of the next song are mixed with audio data of the current song such that both songs A and B are audible simultaneously during the transition as described above. Continuing the swiping gesture in a forward direction Finally leads to a completion of the transition until only audio data of song B are played (FIG. 2c). At this point in time, i. e. when reaching the end of the transition, song selection is changed to the next song, song B, such that song B is the new current song, whereas song A is then the new adjacent song or the new previous song for any future operations of device 10, until song selection is changed again.

Playback of song A, song B or a mixture thereof is visualized by displaying video data associated with the respective songs at display 12. Video data may comprise static images, moving images or any type of static or moving graphic or text that is individual for an individual song. In the illustrated example shown in the figures, video data VA of song A is illustrated by a rounded rectangle 50A and a displayed text "song A", while video data VB of song B are illustrated by a rounded rectangle 50B and a text "song B". As shown in FIGS. 2a, 2b and 2c, in a state at the beginning of the transition where only audio data of song A are played, only video data VA of song A are displayed. A user may then perform the forward swiping gesture F to drag the video data VA in forward direction, whereby the video data VA of song A are continuously swiped off the screen, i.e., display area occupied by video data VA of song A is continuously decreased, while at the same time the video data VB of song B emerge on display 12, i.e., display area occupied by video data VB of song B is continuously increased to the extent of the decrease of the VB display area (FIG. 2b). At the end of the transition, as illustrated in FIG. 2c, only video data VB of song B are visible at display 12.

After completing the transition and playing song B as the new current song, the same swiping gesture as performed for the transition from song A to song B may be repeated to perform another transition from song B to the next song in the sequence of songs such that repeated performance of the same swiping gesture will stepwise browse through the sequence of songs and will visually move a chain of songs (video data) across the display 12 in forward swiping direction F.

Starting from the situation according to FIG. 2c, i. e. having completed the transition to song B as the new current song, a user may alternatively perform a reverse swiping gesture along a reverse swiping direction R as shown in FIGS. 3a, 3b and 3c. In the illustrated example, the reverse swiping direction R is opposite to the forward swiping direction F, in particular is a downward swiping direction. A transition is then played towards the previous song along the sequence of songs which then is song A. Again, both audio mixing ratio and video mixing ratio are changed in synchronicity to one another according to a position of the user's finger during the swiping gesture. After finishing the swiping gesture the transition to the previous song A is completed (FIG. 3c) and song selection is changed to select song A as the new current song (again), whereas song B then forms the new next song (again) for any future operations of the device until another swiping gesture is detected.

It should be noted that while performing the swiping gesture, i.e., during the transition between songs A and B (situations in FIG. 2b or 3b), the speed of the movement of the users finger may vary and so may the speed of the change in audio mixing ratio and video mixing ratio vary as well. In particular, the user may even stop the movement of the finger at any position during the transition without detaching the finger from the display 12, whereupon device 10 maintains constant both the current audio mixing ratio and the current video mixing ratio such that mixed audio data are played back continuously with the current audio mixing ratio as long as the users finger maintains this position.

Device 10 may further be configured to continuously change the audio mixing ratio at a predetermined rate if the users finger is lifted off the display 12 and is thus not touching display 12. For example, if the touch is released amid a swiping gesture, i.e., during a transition, device 10 may automatically either continue the transition into the direction previously initiated by the interrupted swiping gesture (i.e., in forward swiping direction in FIG. 2b or in reverse swiping direction in FIG. 3b), or it may automatically change the direction of the transition and return to the current song. A change rate of the audio mixing ratio during such automatic transition may be set to a constant value or at least to a value below a predefined threshold value in order to avoid rapid or sudden transitions that may lead to a break of the musical flow. Furthermore, a decision as to whether the automatic transition is to be performed in a direction towards the adjacent song or back to the current song may be made depending on the current mixing ratio at the point in time when the touching gesture is interrupted by lifting off the finger. For example, if the touch is released in the first half of the transition in which the current song is predominantly represented in the mixed audio data, the device may decide to carry out an automatic transition such as to return to the current song, whereas if the touch is released in the second half of the transition in which the adjacent song is predominantly represented in the mixed audio data, the device may decide to continue the transition towards the adjacent song.

In another example, where device 10 may perform an automatic transition not corresponding to an actual detected position of the users hand, device 10 may detect a fast swiping gesture in which a detected speed of the users hand (swiping speed) exceeds a predetermined threshold value. When such a fast swiping gesture is detected, device 10 may perform an automatic transition to the adjacent song corresponding to the swiping direction detected, wherein the audio mixing ratio is continuously changed by device 10 (independent of any user interaction) and wherein a change rate of the audio mixing ratio is maintained either constant or below a predefined threshold value to avoid any sudden changes of the musical flow.

FIGS. 4a, 4b and 4c illustrate a second embodiment of the present invention which is a modification of the first embodiment of the present invention explained above with reference to FIGS. 1, 2a to 3c. In the following, only the differences with regard to the first embodiment will be explained in more detail, wherein reference is made to the description above of the first embodiment with respect to all other components and functions.

Device 110 of the second embodiment supports a mix swiping gesture along a mix swiping direction M which is a different, preferably orthogonal, to the forward swiping direction F and the reverse swiping direction R. When the mix swiping gesture is detected, device 110 initiates a transition from current song A to an adjacent song B corresponding to the movement of the users hand as illustrated in FIG. 4b. The transition is however not completed by a single mix swiping gesture but rather the device enters an intermediate state as shown in FIG. 4c in which songs A and B are mixed together, preferably in equal parts. During this intermediate state, the mixing ratio is kept constant even if the touch is released and the finger of the user is lifted off the display. Thus, the mixed audio data are played back as long as the intermediate state is not manually terminated by the user.

Starting from the intermediate state of FIG. 4*c*, a user may repeat the mix swiping gesture along mix swiping direction M to complete the transition to song B, or may perform another swiping gesture in a direction opposite to the mix swiping direction M in order to carry out a transition back to the current song A.

In the second embodiment, device 110 may still have the same functionality of forward swiping and reverse swiping as explained above for the first embodiment in FIGS. 2*a* to 3*c* which allows a user to quickly browse through the sequence of songs or play continuous transitions from the current song to an adjacent song with only one continuous swiping gesture. At the same time, the user is given another option to perform the mix swiping gesture as explained with reference to FIGS. 4*a* to 4*c* such as to enter a stable intermediate state in which the touch may be released while playback of mixed audio data is continued until further manual control. Note that device 110 of the second embodiment may be configured such as to allow the forward swiping gesture corresponding to FIGS. 2*a*, 2*b* and 2*c* and/or the reverse swiping gesture according to FIGS. 3*a*, 3*b* and 3*c* even in the intermediate state according to FIG. 4*c* or in a state of a transition towards the intermediate state according to FIG. 4*b*.

A device and a method according to a third embodiment of the present invention will now be described with reference to FIGS. 5*a*, 5*b* and 5*c*, wherein only the differences with respect to the first and the second embodiments will be explained in more detail and reference is made to the above description of the first and the second embodiments for all remaining components and functions.

A device 210 of the third embodiment is capable of entering an intermediate state (FIG. 5*c*) which corresponds to the intermediate state as described above for the second embodiment and FIG. 4*c*, wherein, in the third embodiment, the user initiates the intermediate state by a tapping gesture in which a user taps on the display, for example on a tap button 252 displayed on the display. When the tap gesture is detected, device 210 initiates an automatic transition from the condition shown in FIG. 5*a* in which only song A is played towards the intermediate state of FIG. 5*c* in which mixed data obtained from mixing song A and song B, preferably at equal parts, are played back. During the automatic transition, the mixing ratio is continuously changed wherein a change rate of the audio mixing ratio is preferably kept constant or is set to not exceed a predefined threshold value.

With reference to FIGS. 6*a* to 6*f*, a fourth embodiment of the present invention will now be explained in more detail. The fourth embodiment again is a modification of the first embodiment such that only the differences with respect to the first embodiment will be explained in more detail and reference is made to the description above of the first embodiment with respect to all other components and functions.

In the fourth embodiment of the present invention, device 310 is again capable of entering a stable intermediate state (FIG. 6*c*) which corresponds to an intermediate state as described above for the second and the third embodiments (FIGS. 4*c* and 5*c*, respectively). In the fourth embodiment, the intermediate state can be reached through the forward swiping gesture or the reverse swiping gesture, i. e. the same swiping gesture (in the same swiping direction F/R) as used to perform a transition to an adjacent song. In particular, starting from a condition in which only song A is played back (FIG. 6*a*), a first forward swiping gesture in forward swiping direction F results in starting a continuous transition (continuous change of audio mixing ratio and video mixing ratio) in a direction towards the next song B. In contrast to the first embodiment, the transition is not completed even if the swiping gesture is completed and not interrupted, but the intermediate state according to FIG. 6*c* is entered in which mixed audio data comprising both song A and song B audio data, preferably to equal parts, are played back continuously until further user input. If the user then performs a second swiping gesture in forward direction, device 310 will leave the intermediate state and continue to transition towards song B (FIG. 6*e*) until the transition is completed and only song B is played back and song selection is changed to set song B as the new current song (FIG. 6*f*).

Alternatively, if a user, starting from the intermediate state of FIG. 6*c*, inputs a reverse swiping gesture in reverse swiping direction opposite to forward swiping direction F, a transition in reverse direction is performed such as to return to the current song A.

Although not described again, in each of the second, the third and the fourth embodiments, automatic transitions may be performed by the devices 110, 210 and 310, respectively, if the users finger is lifted off the display during a swiping gesture, i.e., while moving the finger across the display. The automatic transition following such interrupted touching gesture may either continue, for a certain amount of time, the transition as controlled by the swiping gesture directly before its interruption, or may alternatively reverse the transition to return to the condition before starting the interrupted swiping gesture.

It is further to be noted that the stable intermediate states as described above for the second, third and fourth embodiments may provide additional functionality. For example, if the device uses decomposed tracks for providing the mixed audio data, specific decomposed tracks may be swapped between the two songs when reaching the intermediate state. In one example, in the intermediate state, the decomposed drum tracks of the current song may be played with high volume, whereas the decomposed drum tracks of the adjacent song may be silent or played with lower volume. At the same time, the decomposed instrumental tracks of the adjacent song may be played with a high volume, whereas the decomposed instrumental tracks of the current song may be silenced or played with lower volume. The user then will hear the instrumentals of the adjacent song mixed with the drums of the current song which may be desired for artistic reasons.

The invention claimed is:

1. A device for playing audio data, comprising:

an audio input unit for providing audio data of a sequence of three or more songs;

a user input unit for detecting at least a swiping gesture of a user's hand;

a song selection unit configured to select a song from among the sequence of three or more songs as a current song for playback, and to change song selection from a current song to an adjacent song in the sequence of three or more songs each time the swiping gesture is detected, such that repeated detection of the swiping gesture results in a consecutive selection of the three or more songs along the sequence of three or more songs;

a playback unit for playing audio data of at least the current song; and a mixing unit for obtaining mixed audio data by mixing audio data of the current song with audio data of the adjacent song of the sequence of three or more songs received from the audio input unit, using an audio mixing ratio representing an audible contribution between the adjacent song and the current song, wherein the mixing unit is configured to set the audio mixing ratio based on a position of the user's hand during the swiping gesture, detected by the user input unit, or to continuously change the audio mixing ratio upon detection of the swiping gesture, and wherein the playback unit is configured to play the mixed audio data when the swiping gesture is detected.

2. The device of claim 1, wherein the user input unit is configured to detect at least:

a forward swiping gesture, wherein the user's hand can be moved in a forward swiping direction, and a reverse swiping gesture, wherein the user's hand is moved in a predetermined reverse swiping direction that is opposite to the forward swiping direction, and wherein repeated detection of the forward swiping gesture results in a consecutive selection of a next song of the three or more songs along a forward direction of the sequence of three or more songs, and wherein repeated detection of the reverse swiping gesture results in a consecutive selection of a previous song of the three or more songs along a reverse direction of the sequence of three or more songs.

3. The device of claim 1, wherein the audio mixing ratio between the adjacent song and the current song is set to continuously change depending on the position of the user's hand to increase when the user's hand moves along a swiping direction corresponding to a change of song selection from the current song to the adjacent song, and to decrease when the user's hand moves along a direction opposite to the swiping direction.

4. The device of claim 1, further comprising a beats per minute ("BPM") matching unit configured to adjust tempo of at least one of the current song and the adjacent song such that the current song and the adjacent song have matching BPM.

5. The device of claim 1, further comprising a beat matching unit configured to set or adjust a playback position of the adjacent song such that the current song and the adjacent song have matching beat phase.

6. The device of claim 1, further comprising a pitch shifting unit configured to shift a pitch of at least one of the current song and the adjacent song such that the current song and the adjacent song have matching keys.

7. The device of claim 1, further comprising a song section detection unit configured to detect song sections of the adjacent song including a starting song section and a predetermined song section different from the starting song section, and wherein the playback unit is configured to start, upon detection of the swiping gesture by the user input unit, playback of the adjacent song at a position within a region around a target playback position, the target playback position corresponding to a beginning of the predetermined song section.

8. The device of claim 7, wherein the device is configured to set or reset the target playback position of the adjacent song to a beginning of the starting song section of the adjacent song or to the beginning of the predetermined song section of the adjacent song when the audio mixing ratio between the adjacent song and the current song is zero and a swiping gesture towards the adjacent song is detected.

9. The device of claim 1, wherein the device is configured to:

play the current song;

upon detection of a first occurrence of a swiping gesture perform a transition to an intermediate state in which the mixed audio data are played with substantially equal audible contributions of both the current song and the adjacent song;

maintain the intermediate state during a time period in which no occurrence of the swiping gesture is detected; and upon detection of a second occurrence of the swiping gesture, cause the playback unit to change from playing the current song to play the adjacent song.

10. The device of claim 1, wherein the user input unit is configured to detect at least a forward swiping gesture, wherein the user's hand is moved in a forward swiping direction, wherein repeated detection of the forward swiping gesture results in a consecutive selection of a next song of the three or more songs along a forward direction of the sequence of three or more songs; and a predetermined mix input from the user received from the user input unit, which is different from the forward swiping gesture, wherein the device is configured to:

enter an intermediate state in which a predetermined mixed audio data is played, the predetermined mixed audio data comprising audio with a predetermined audio mixing ratio between the next song and the current song ranging from 30% to 70% upon detection of the forward swiping gesture;

maintain the intermediate state during a time period in which no gesture is detected; and cause the playback unit to play the next song upon detection of the forward swiping gesture.

11. The device of claim 1, wherein the user input unit is configured to detect at least:

a forward swiping gesture, wherein the user's hand is moved in a forward swiping direction, wherein repeated detection of the forward swiping gesture results in a consecutive selection of a selected song of the three or more songs along a forward direction of the sequence of three or more songs, wherein the three or more songs include a first adjacent song and a subsequent adjacent song; and a predetermined control input from the user, which is different from the forward swiping gesture, wherein the device, upon detection of the predetermined control input, is configured to perform at least one of:

writing an identification of the current song to a playlist;

skipping the first adjacent song and designating the subsequent adjacent song along with the sequence of three or more songs to be the next song;

applying an audio effect to at least one of the current song and the next song; or entering an effect setting mode in which subsequent user input is accepted for selecting or changing parameters of at least one audio effect to be applied to at least one of the current song and the next song.

12. The device of claim 1, wherein the device is configured to continuously change the audio mixing ratio between the adjacent song and the current song depending on the position of the user's hand, and wherein, when the user input unit detects a swiping gesture of the user's hand in which a swiping speed exceeds a predetermined threshold value, the device is configured to continuously change the audio mixing ratio between the adjacent song and the current song from its current value to 100 percent, wherein a transition speed of the continuous change of the audio mixing ratio is set to a predetermined maximum transition speed.

13. The device of claim 1, further comprising an effect unit which is configured to apply an audio effect to at least one of the current song and the adjacent song, wherein at least one effect parameter is set to be dependent on the audio mixing ratio.

14. The device of claim 1, further comprising a visualization unit configured to provide video data in association with one or more songs of the sequence of three or more songs, wherein the video data represent video information to be displayed on a display of the device, and wherein the playback unit is configured to playback video data of a currently output song on a display of the device in correspondence and synchronization with playback of the audio data of the currently output song through an audio output of the device, wherein the visualization unit is configured to provide mixed video data by mixing video data of the current song with video data of the adjacent song using a video mixing ratio, wherein the video mixing ratio visually represents an audio contribution for each of the current song and the adjacent song, and wherein the playback unit is configured to play back the mixed video data on the display in correspondence and synchronization with playback of the mixed audio data.

15. The device of claim 1, comprising at least three memory areas including a first memory area storing audio data of a current song, a second memory area storing a previous song in the sequence of three or more songs, and a third memory area storing a next song in the sequence of three or more songs, wherein the device is configured to override at least one of the first memory area, the second memory area, or the third memory area with audio data of a fourth song of the sequence of three or more songs when the song selection unit changes song selection from the current song to either the previous song or the next song, said fourth song being different from the current song, the previous song and the next song.

16. The device of claim 1, further comprising a decomposition unit configured to decompose audio data of at least one song of from among the sequence of three or more songs to obtain a decomposed track representing at least one, but not all, of a set of musical timbres included in the song, wherein the mixing unit is configured to obtain the mixed audio data by mixing the decomposed track with other audio data of the current song or the adjacent song.

17. A method for playing audio data, comprising:

providing, to one or more processors, audio data of a sequence of three or more songs;

accessing, by the one or more processors, a current song in the sequence of three or more songs for playback;

playing, via one or more speakers coupled to the one or more processors, audio data of the current song;

detecting, by the one or more processors, a swiping gesture of a user's hand and changing song selection from the current song to an adjacent song in the sequence of three or more songs each time the swiping gesture is detected, such that repeated detection of the swiping gesture results in a consecutive selection of the three or more songs along the sequence of three or more songs, setting, by the one or more processors, an audio mixing ratio representing an audible contribution between the adjacent song and the current song based on a position of the user's hand during the detected swiping gesture, or changing the audio mixing ratio in a continuous manner upon detection of the swiping gesture;

obtaining, by the one or more processors, mixed audio data by mixing the audio data of the current song with audio data of the adjacent song using the audio mixing ratio; and playing, via the one or more speakers, the mixed audio data when the swiping gesture is detected.

18. The method of claim 17, further comprising:

detecting, by the one or more processors, a forward swiping gesture, wherein the user's hand is moved in a forward swiping direction; and detecting, by the one or more processors, a reverse swiping gesture, wherein the user's hand is moved in a predetermined reverse swiping direction that is opposite to the forward swiping direction, wherein repeated detection of the forward swiping gesture results in a consecutive selection of a next song of the three or more songs along a forward direction of the sequence of three or more songs, and wherein repeated detection of the reverse swiping gesture results in a consecutive selection of a previous song of the three or more songs along a reverse direction of the sequence of three or more songs.

19. The method of claim 17, wherein the audio mixing ratio between the adjacent song and the current song is set to continuously change depending on the position of the user's hand to increase when the user's hand moves along a swiping direction corresponding to a change of song selection from the current song to the adjacent song, and to decrease when the user's hand moves along a direction opposite to the swiping direction.

20. The method of claim 17, further comprising a step of detecting, by the one or more processors, song sections of the three or more songs, including for each song of the three or more songs, a starting song section and a predetermined song section different from the starting song section, wherein, upon detection of the swiping gesture, playback of the adjacent song is started at a position corresponding to a beginning of the predetermined song section of the adjacent song.

21. The method of claim 20, further comprising resetting, by the one or more processors, a target playback position of the adjacent song to the beginning of the starting song section of the adjacent song or to a beginning of a predetermined song section of the adjacent song, when the audio mixing ratio between the adjacent song and the current song is zero and a swiping gesture towards the adjacent song is detected.

22. The method of claim 17, further comprising:

playing, via the one or more speakers, the current song or playing the mixed audio data with an audio mixing ratio of zero;

upon detection of a first occurrence of a swiping gesture, performing a transition to an intermediate state in which a predetermined mixed audio data is output, the predetermined mixed audio data comprising audio with a predetermined audio mixing ratio representing an audio contribution for each of the next song and the current song between 30% and 70%;

maintaining the intermediate state during a time period in which no occurrence of the swiping gesture is detected; and upon detection of a second occurrence of the swiping gesture, changing a song selection to the adjacent song for output via the one or more speakers.

23. The method of claim 17, comprising the steps of:

detecting a forward swiping gesture, wherein the user's hand is moved in a forward swiping direction, wherein repeated detection of the forward swiping gesture results in a consecutive selection of a next song of the three or more songs along a forward direction of the sequence of three or more songs;

detecting a predetermined mix input from the user, which is different from the forward swiping gesture;

entering an intermediate state in which a predetermined mixed audio data is output, the predetermined mixed audio representing an audio contribution ratio for each of the next song and the current song between 30% to 70%;

maintaining the intermediate state during a time period in which no gesture is detected; and changing song selection to the next song for output via the one or more speakers.

24. The method of claim 17, further comprising:

detecting a forward swiping gesture, wherein the user's hand is moved in a forward swiping direction, wherein repeated detection of the forward swiping gesture results in a consecutive selection of a selected song of the three or more songs along a forward direction of the sequence of three or more songs, wherein the three or more songs include a first adjacent song and a subsequent adjacent song; and detecting a predetermined control input from the user, which is different from the forward swiping gesture, wherein, upon detection of the predetermined control input, the method includes at least one of:

writing an identification of the current song to a playlist;

skipping the first adjacent song and designating the subsequent adjacent song along the sequence of three or more songs to be a next song;

applying an audio effect to at least one of the current song and the next song; or entering an effect setting mode in which subsequent user input is accepted for selecting or changing parameters of at least one audio effect to be applied to at least one of the current song and the next song.

25. The method of claim 17, further comprising continuously changing the audio mixing ratio between the adjacent song and the current song depending on the position of the user's hand, wherein when a swiping gesture of the user's hand is detected in which a swiping speed of the user's hand exceeds a predetermined threshold value, the audio mixing ratio between the adjacent song and the current song is continuously changed from its current value to 100 percent, wherein a transition speed defining a speed in which the audio mixing ratio is continuously changed is limited by a predetermined maximum transition speed, wherein the predetermined maximum transition speed is lower than the swiping speed of the user's hand.

26. The method of claim 17, further comprising: applying an audio effect to at least one of the current song and the adjacent song, wherein at least one effect parameter is set to be dependent on the audio mixing ratio.

27. The method of claim 17, further comprising:

providing video data in association with one or more of the sequence of three or more songs, wherein the video data represent video information to be displayed on a display;

playing video data of a song on a display in correspondence and synchronization with playback of the audio data of the current song; and providing mixed video data by mixing video data of the current song with video data of the adjacent song using a video mixing ratio, wherein the video mixing ratio visually represents an audio contribution for each of the current song and the adjacent song, wherein the mixed video data are played as video data on a display in correspondence and synchronization with playback of the mixed audio data.

28. The method of claim 17, wherein the sequence of three or more song comprises, subsequently along the sequence of three or more songs, in order, a first song, a second song, a third song, a fourth song, and a fifth song, wherein the method further comprises:

storing audio data of the second song of the sequence of three or more songs in a first memory area;

storing audio data of the third song of the sequence of three or more songs in a second memory area;

storing audio data of the fourth song of the sequence of three or more songs in a third memory area;

playing audio data of the third song by accessing the second memory area; and while playing the third song accessed from the second memory area, detecting either a forward swiping gesture or a reverse swiping gesture, wherein the forward swiping gesture causes the fourth song to be output by accessing the third memory area and further causes the first memory area to be overwritten with audio data of the fifth song, and the reverse swiping gesture causes the second song to be output by accessing the first memory area and further causes the third memory area to be overwritten with audio data of the first song.

29. The method of claim 17, further comprising:

decomposing, by the one or more processors, audio data of at least one song of from among the sequence of three or more songs to obtain decomposed track of representing at least one, but not all, of a set of musical timbres included in the song; and obtaining, by the one or more processors, the mixed audio data by mixing the decomposed track with other audio data of the current song or the adjacent song.

30. A non-transitory computer readable medium storing executable instructions, which when executed by a processing device, cause the processing device to perform operations comprising:

providing audio data of a sequence of three or more songs;

selecting a current song in the sequence of three or more songs for playback;

playing, via the one or more speakers, audio data of at least the current song;

detecting a swiping gesture of a user and changing song selection from the current song to an adjacent song in the sequence of three or more songs each time the swiping gesture is detected, such that repeated detection of the swiping gesture results in a consecutive selection of the three or more songs along the sequence of three or more songs;

setting an audio mixing ratio representing an audible contribution between the adjacent song and the current song based on a position of the user's hand during the swiping gesture, or changing the audio mixing ratio in a continuous manner upon detection of the swiping gesture;

obtaining mixed audio data by mixing audio data of the current song with audio data of the adjacent song of the sequence of three or more songs, using the audio mixing ratio; and playing the mixed audio data when the swiping gesture is detected.

* * * * *